United States Patent [19]

Fukudome

[11] Patent Number: 5,367,235
[45] Date of Patent: Nov. 22, 1994

[54] POWER STEERING DEVICE HAVING ELECTRICALLY DRIVEN PUMP

[75] Inventor: Fukuo Fukudome, Kashiwara, Japan
[73] Assignee: Koyo Seiko Co., Ltd., Osaka, Japan
[21] Appl. No.: 978,714
[22] Filed: Nov. 19, 1992
[30] Foreign Application Priority Data Nov. 20, 1991 [JP] Japan .............................. 3-095249[U]

[51] Int. Cl.⁵ ...................................... B62D 5/04
[52] U.S. Cl. ........................................ 318/286; 180/79.1
[58] Field of Search ........................ 318/434, 280–286,
318/254, 439, 138; 388/928.1, 930, 831;
180/79.1, 132, 136, 141–143; 364/426.04, 565

[56] References Cited

U.S. PATENT DOCUMENTS

| | | | |
|---|---|---|---|
| Re. 30,492 | 1/1981 | Blakeslee | 180/79.1 |
| 4,532,567 | 7/1985 | Kade | 318/434 X |
| 4,658,584 | 4/1987 | Suzuki et al. | |
| 4,837,692 | 6/1989 | Shimizu | 180/79.1 |
| 4,986,380 | 1/1991 | Morishita | 180/79.1 |
| 5,000,278 | 3/1991 | Morishita | 388/831 X |
| 5,198,981 | 3/1993 | Collier-Hallman et al. | 180/79.1 |

FOREIGN PATENT DOCUMENTS 0296444 12/1988 European Pat. Off. .
3318547 11/1983 Germany .
3523293 1/1986 Germany .

*Primary Examiner*—Jonathan Wysocki
*Attorney, Agent, or Firm*—Popham Haik Schnobrich & Kaufman, Ltd.

[57] ABSTRACT

A power steering device having a pump to be driven by an electric motor and adapted to assist in steering a vehicle with hydraulic pressure produced by the pump. The device includes a controller for interrupting application of voltage to the motor for a predetermined period of time, calculating the number of revolutions of the motor based on the resulting counter electromotive force between the terminals of the motor and controlling the flow rate of the pump based on the calculated number of revolutions.

2 Claims, 4 Drawing Sheets

5,367,235

POWER STEERING DEVICE HAVING ELECTRICALLY DRIVEN PUMP

BACKGROUND OF THE INVENTION

The present invention relates to power steering devices having a pump to be driven by an electric motor and adapted to assist in steering vehicles with hydraulic pressure produced by the pump.

With conventional power steering devices of the above-mentioned type having a motor-driven pump, the voltage to be applied to a d.c. motor for driving the pump is altered to control the pump relative to the speed of the vehicle.

However, when the pressure of the pump of the conventional power steering device increases during steering, the motor current increases to entail a decreased number of revolutions since the d.c. motor is in operation at a fixed voltage, consequently resulting in a reduced flow rate. This poses a problem, for example, as to the responsiveness of the power steering device. To overcome the problem, it is required to detect the flow rate of the pump for flow control whereas no simple means has been available for detecting the flow rate of the pump. Although the flow rate of the pump can be detected by detecting the number of revolutions of the motor for driving the pump, this requires use of a revolution sensor.

SUMMARY OF THE INVENTION

An object of the present invention is to provide a power steering device having a motor-driven pump which is easily controllable in flow rate without necessitating any additional revolution sensors.

The present invention provides a power steering device having a pump to be driven by an electric motor and adapted to assist in steering a vehicle with hydraulic pressure produced by the pump, the power steering device being characterized in that the device comprises control means for interrupting application of voltage to the motor for a predetermined period of time, calculating the number of revolutions of the motor based on the resulting counter electromotive force between motor terminals and controlling the flow rate of the pump based on the calculated number of revolutions.

When the application of voltage to the motor is interrupted for the predetermined period of time, the motor continues to rotate owing to inertia with the number of revolutions before the interruption, with the result that a counter electromotive force is produced between the terminals of the motor. This counter electromotive force corresponds to the number of revolutions before the interruption of application of the voltage and is usable for calculating the revolution number.

Therefore, with the power steering device of the invention, the number of revolutions of the motor for driving the pump can be easily detected without using any additional revolution sensor, and the pump is readily controllable in flow rate based on the detected revolution number. This precludes the decrease in the flow rate due to a rise in the pressure of the pump during steering to ensure highly responsive control.

DESCRIPTION OF THE PREFERRED EMBODIMENT

An embodiment of the invention will be described below with reference to the drawings.

Figure 1:
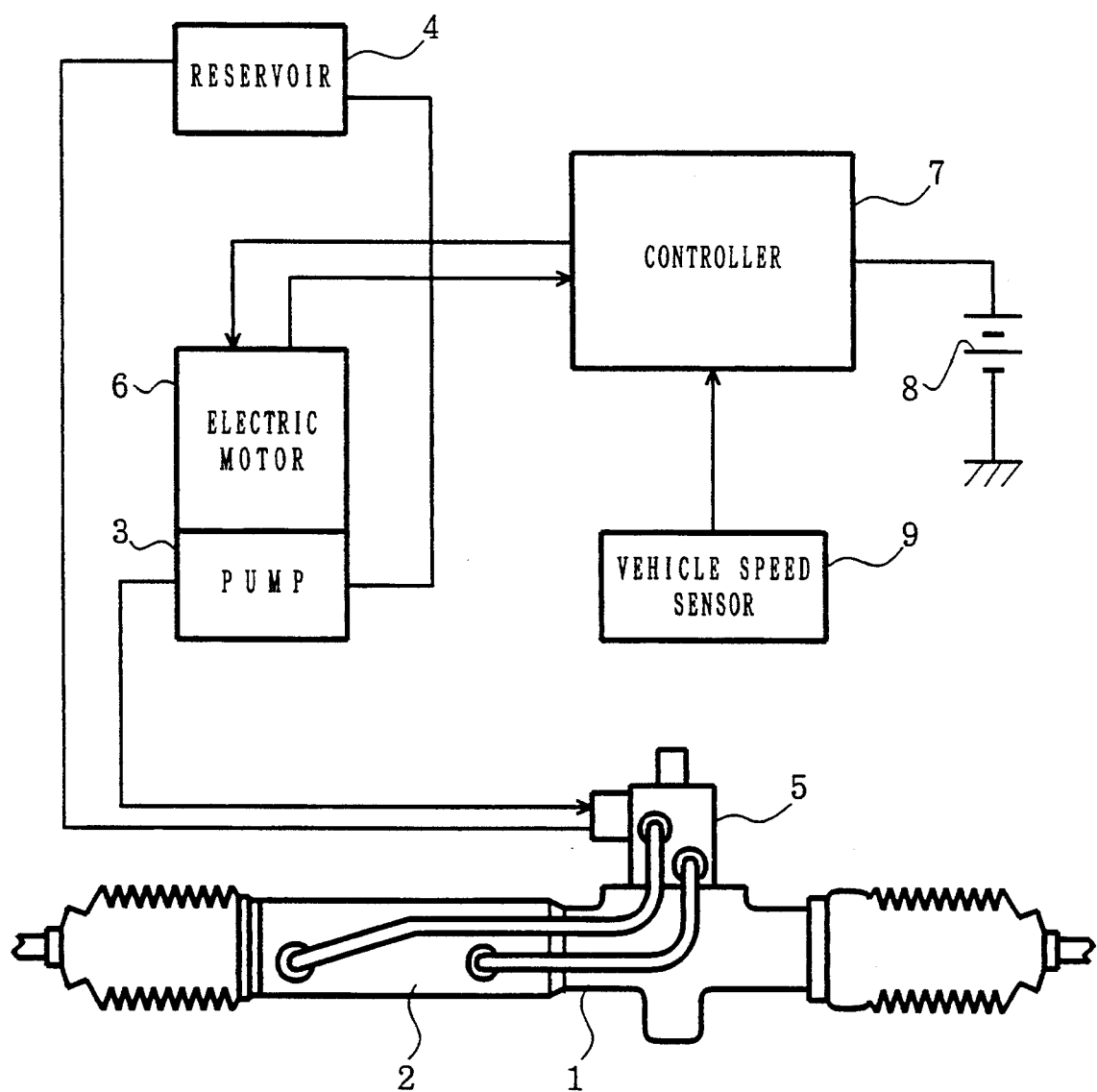
FIG. 1 is a diagram showing the construction of a power steering device having a motor-driven pump and embodying the invention.

FIG. 1 schematically shows the overall construction of a power steering device.

The device is of the rack-pinion type. A steering gear box 1 houses a pinion coupled to a steering wheel, and a rack bar meshing therewith although these members are not shown. The rack bar extends into a power cylinder 2 connected to the gear box 1. A control valve 5 in communication with a pump 3 and a reservoir 4 is provided between the steering wheel and the pinion. The pump 3 is driven by an electronic motor 6. The reservoir 4 contains oil, which is pressurized by the pump 3 and supplied to one of two oil chambers of the power cylinder 2 through the control valve 5, and at the same time, oil in the other oil chamber of the power cylinder 2 is returned to the reservoir 4 via the control valve 5, whereby the device assists in steering a vehicle. Further in accordance with the direction in which the steering wheel is manipulated and with the amount of steering, the control valve 5 controls the direction and amount of the oil to be supplied to the power cylinder 2.

The motor 6 for driving the pump 3 is connected to a controller 7 serving as control means for controlling the flow rate of the pump 3. The controller 7 comprises a microcomputer and has a battery 8 and a vehicle speed sensor 9 connected thereto.

Figure 2:
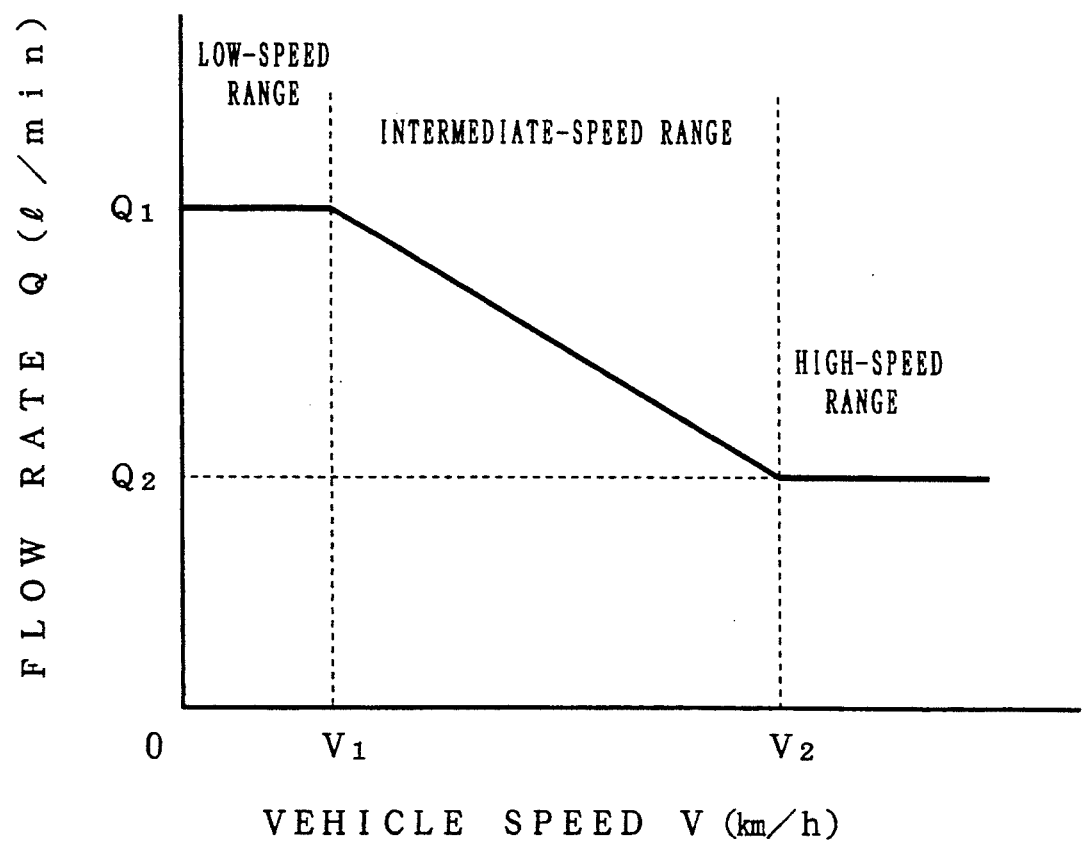
FIG. 2 is a graph showing the relationship between the vehicle speed and the pump flow rate.

The controller 7 detects the speed of the vehicle and the pump flow rate and controls the flow rate of the pump 3 based on the detected values as will be described below. The controller 7 has stored therein the relationship between the vehicle speed V and the pump flow rate Q as shown in FIG. 2. With reference to FIG. 2, the pump flow rate is a constant value Q1 for a low-speed range in which the vehicle speed ranges from 0 to a first speed V1, a constant value Q2 smaller than Q1 for a high-speed range in which the vehicle speed is in excess of a second speed V2 greater than V1, and a value linearly decreasing from Q1 to Q2 with a negative gradient for an intermediate-speed range in which the vehicle speed ranges from V1 to V2. The controller 7 detects the vehicle speed by the speed sensor 9 at a predetermined time interval, and determines a desired value of pump flow rate corresponding to the vehicle speed detected every time, from the relationship shown in FIG. 2. The controller 7 further interrupts the application of voltage to the motor 6 for a predetermined period of time at a given interval, calculates the number of revolutions of the motor 6 during that time based on the counter electromotive force produced every time between the terminals of the motor 6, and calculates the pump flow rate from the calculated revolution number. The controller 7 then controls the motor 6 so that the pump flow rate thus calculated will become equal to the desired value determined as above.

When the application of voltage to the motor 6 is interrupted for the predetermined period of time, the motor 6 continues to rotate owing to inertia created by the number of revolutions before the interruption, producing a counter electromotive force between the terminals of the motor 6. This counter electromotive force corresponds to the number of revolutions before the interruption of application of the voltage and is usable for calculating the revolution number of the motor 6. The revolution number of the motor 6 is in proportion to the pump flow rate, which can therefore be calculated from the revolution number.

Next with reference to the flow chart of FIG. 3 and the timing chart of FIG. 4, a description will be given of an exemplary process for detecting the number of revolutions of the motor 6 by the controller 7.

Figure 3:
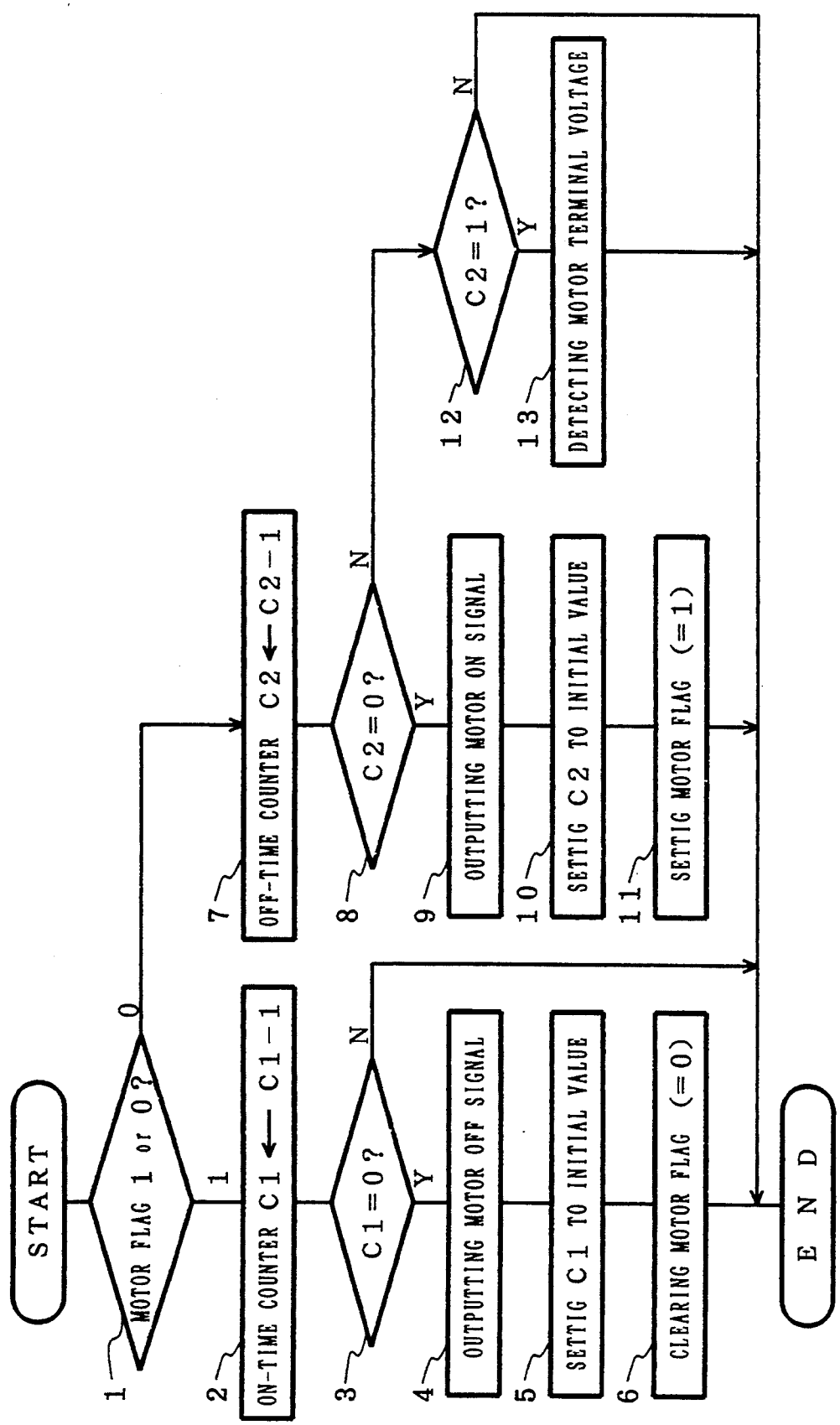
FIG. 3 is a flow chart showing an example of process for detecting the number of revolutions of a motor by a controller.
Figure 4:
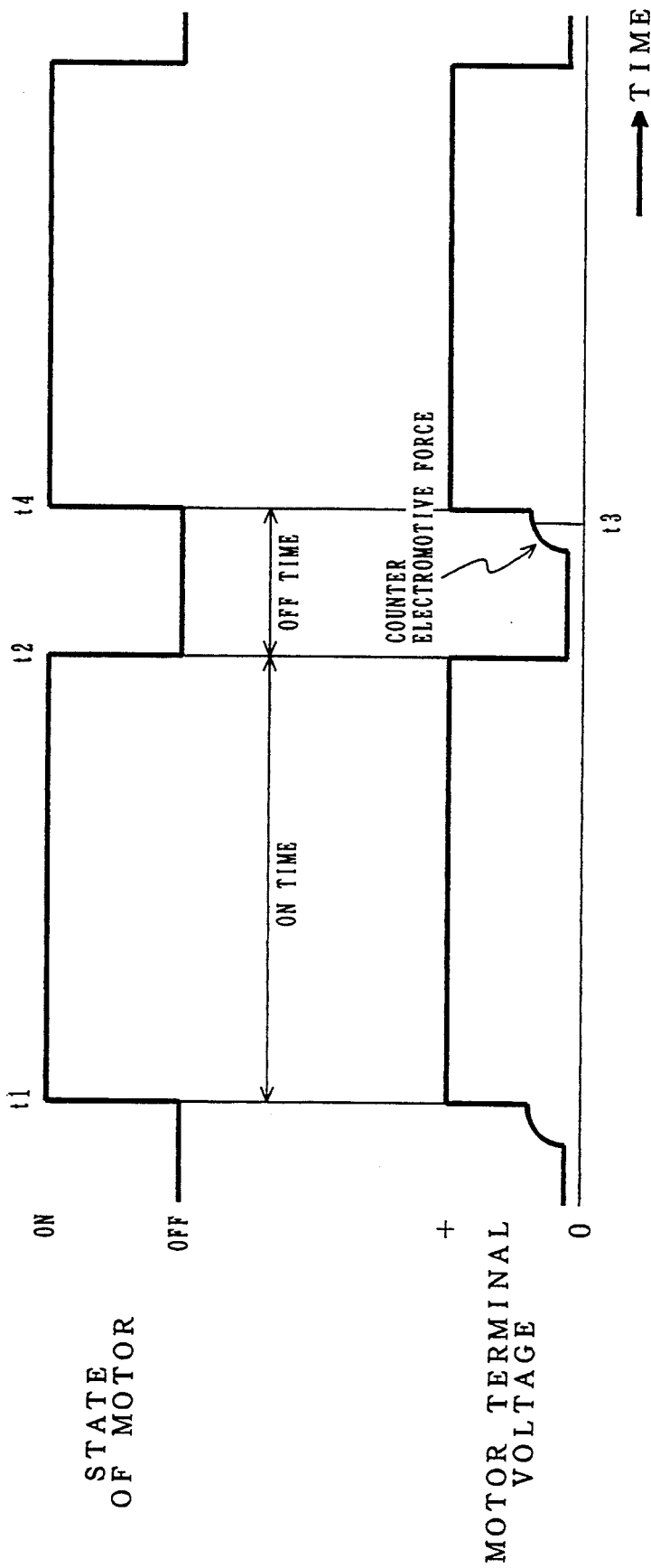
FIG. 4 is a timing chart showing different states of the motor and the resulting change in the terminal voltage of the motor.

The process of FIG. 3 is repeatedly executed at a predetermined time interval. First, a motor flag is checked (step 1). The motor flag represents a state wherein voltage is applied to the motor 6 (on state), or a state wherein voltage application is interrupted (off state). The motor is in on state when the flag is set to "1", or in off state when the flag is cleared to "0". If the motor flag is found to be "1" in Step 1, step 2 follows in which 1 is subtracted from an on-time counter C1 and the counter C1 is set to the resulting value. Next, the on-time counter C1 is checked as to whether it is "0" (step 3). When it is "0", a motor off signal is output in the next step 4 to interrupt application of voltage to the motor 6. Subsequently, the on-time counter C1 is set to an initial value (step 5), and the motor flag is cleared to "0" (step 6) to terminate the sequence. The on-time counter C1 measures the period of time during which the motor is held on (on time=period from time t1 to time t2 in FIG. 4). In step 5, the counter C1 is set to this on time (=t2−t1) as its initial value. Unless the on-time counter C1 is found to be "0" in stem 3, the sequence comes to an end as it is. When the motor flag is found to be "0" in step 1, the sequence proceeds to step 7, in which 1 is subtracted from an off-time counter C2 and the resulting value is set in the counter. Next, the off-time counter C2 is checked as to whether it is "0" (step 8). If it is "0", step 9 follows to output a motor on signal and apply voltage to the motor 6. The off-time counter C2 is then set to an initial value (step 10), the motor flag is set to "1" (step 11), and the sequence terminates. The off-time counter C2 is used for measuring the period of time during which the motor 6 is held off (off time=-period from time t2 to time t4 in FIG. 4). In stem 10, the counter C2 is set to this off time (=t4−t2) as its initial value. Unless the off-time counter C2 is "0" in step 8, the sequence proceeds to step 12 to inquire whether the off-time counter C2 is "1". When it is "1", step 13 follows, in which the terminal voltage of the motor 6 is detected, and the sequence terminates. Unless the off-time counter C2 is found to be "1" in step 12, the sequence comes to an end as it is.

In the case where the motor 6 is in off state, the motor flag is "0", so that the procedure of step 7 et seq. is followed every time the process of FIG. 3 is executed. Upon lapse of the off time at time t1 in FIG. 4, the off-time counter C2 becomes "0" in step 7, followed by step 8, step 9 et seq., in which the motor on signal is output to hold the motor on and set the motor flag to "1", and the off-time counter C2 is set to the off time.

When the motor flag is thus set to "1" with the motor 6 turned on, the sequence proceeds from step 1 to step 2 every time the process of FIG. 3 is executed to subtract 1 from the on-time counter C1 each time. Steps 1, 2 and 3 and ending are repeated until the counter C1 becomes "0", holding the motor 6 in on state. Upon the lapse of on time at time t2 in FIG. 4, the on-time counter C1 changes to "0" in step 2. The sequence therefore proceeds to step 3, step 4 and the following steps, in which the motor off signal is output to change the motor flat to "0"and turn off the motor, and the on-time counter C1 is set to the on time.

When the motor flag is thus cleared to "0" with the motor 6 turned off in this way, step 1 is followed by step 7 to subtract 1 from the off-time counter C2 every time the process of FIG. 3 is executed. Steps 1, 7, 8 and 12 and the subsequent ending are repeated until the counter C2 becomes "1", holding the motor 6 off. When the off-time counter C2 becomes "1" at time t3 in FIG. 4, the sequence proceeds from step 8 to step 13 via step 12 to detect the terminal voltage of the motor 6. When the process of FIG. 3 is subsequently repeated (at time t4 in FIG. 4), the off-time time counter C2 becomes "0"in step 7, and the sequence proceeds from step 8 to step 9 and the following steps, in which the motor on signal is output to turn on the motor and set the motor flag to "1", and the off-time counter C2 is set to the off time as previously described.

The operation of time t1 to time t4 is repeated, and the terminal voltage of the motor 6 is detected at time t3 every time. When the application of voltage to the motor 6 is interrupted during the period of from time t2 to time t4, a counter electromotive force is produced between the terminals of the motor 6 as previously stated. This counter electromotive force is detected by detecting the terminal voltage of the motor 6 at suitable time t3. The number of revolutions of the motor 6 and the pump flow rate are calculated from the detected value of counter electromotive force, and the flow control of the pump 3 is effected based on the calculated result. This precludes the reduction in the flow rate due to an increase in the pump pressure during steering to ensure highly responsive control. Further controlling the pump flow rate relative to the vehicle speed based on the relationship shown in FIG. 2 makes it possible to reduce the amount of work in the high-speed range which involves lesser amounts of steering, consequently diminishing the overall loss.

What I claim is:

1. A power steering device having a pump to be driven by an electric motor and adapted to assist in steering a vehicle with hydraulic pressure produced by the pump, the power steering device being characterized in that the device comprises:

control means for interrupting application of voltage to the motor for a predetermined period of time, calculating the number of revolutions of the motor based on the resulting counter-electromotive force between motor terminals and controlling the flow rate of the pump based on the calculated number of revolutions;

a sensor for detecting the speed of the vehicle;

said control means having stored therein a relationship between the vehicle speed and the desired value of flow rate of the pump and controlling the flow rate of the pump to a desired value of flow rate corresponding to the vehicle speed detected by said sensor;

said relationship between the vehicle speed and the desired value of flow rate of the pump being such that the desired value of pump flow rate is a constant first specified value for vehicle speeds of from 0 to a predetermined first speed, a constant second specified value smaller than the first specified value for vehicle speeds in excess of a predetermined second speed greater than the first speed, and a value having a negative gradient for vehicle speeds of from the first speed to the second speed.

2. A power steering device as defined in claim 1 which further comprises a control valve connected to said pump, and a power cylinder connected to the control valve and wherein the control valve controls the direction and amount of oil to be supplied to the power cylinder in accordance with a direction and amount of manipulation of a steering wheel.

* * * * *